Nov. 18, 1924.
A. C. YOUNGQUIST
EYESHIELD
Filed May 23, 1923
1,516,261
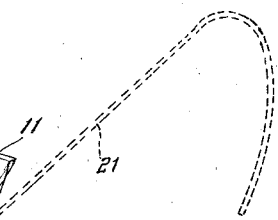
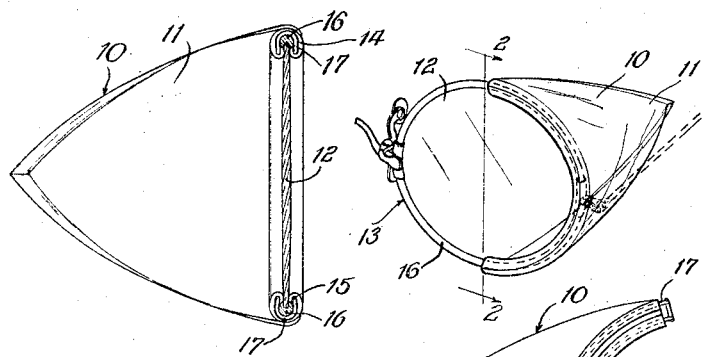
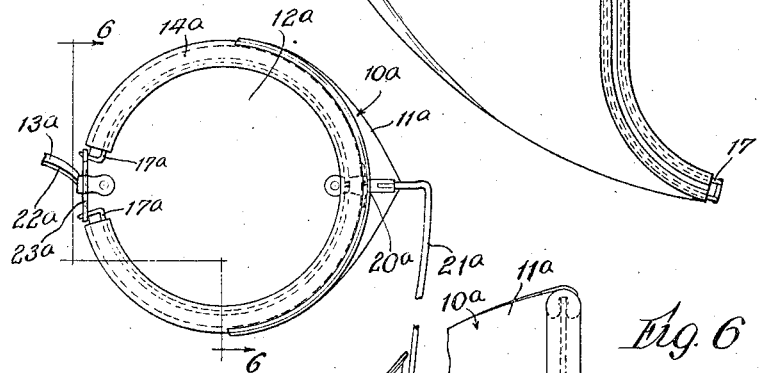
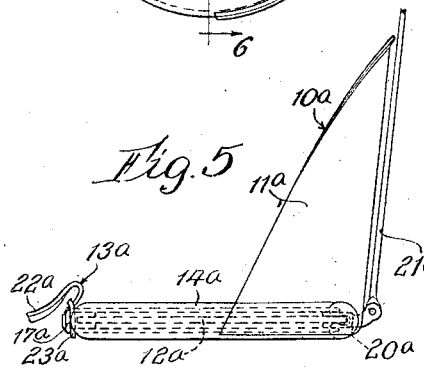

Patented Nov. 18, 1924.

1,516,261

UNITED STATES PATENT OFFICE.

ARVID C. YOUNGQUIST, OF CHICAGO, ILLINOIS.

EYESHIELD.

Application filed May 23, 1923. Serial No. 640,821.

*To all whom it may concern:*

Be it known that I, ARVID C. YOUNGQUIST, a citizen of the United States, residing at Chicago, in the county of Cook and State of Illinois, have invented certain new and useful Improvements in Eyeshields, of which the following is a specification.

The main object of my invention is to provide eye shields of improved construction which may be detachably secured to the usual eyeglasses having lenses particularly adapted to the wearer.

Other objects of my invention are to provide eye shields of the character described which will amply protect the eyes of the wearer and yet not obscure his vision; which may be quickly clipped upon the eyeglasses, and which are adapted to be employed indiscriminately with eyeglasses having lenses of various forms and sizes.

Other objects of my invention will become apparent as the detail description progresses, reference being had to the accompanying drawings, wherein—

Fig. 1 is a perspective view of an eye shield embodying the novel features of my invention, the eye shield being shown in connection with one lens of a pair of eyeglasses.

Fig. 2 is a section taken on line 2—2 of Fig. 1.

Fig. 3 is a view illustrating how the eye shield shown in Fig. 1 may be flattened out so that it may be placed in an envelope, pocket book or the like.

Fig. 4 is an elevation of an eye shield and illustrates another form which my invention may take, the eye shield being shown in connection with one lens of a pair of eyeglasses.

Fig. 5 is a plan elevation of the eye shield and the lens shown in Fig. 4, and Fig. 6 is a section taken on line 6—6 of Fig. 4.

Referring to Figs. 1, 2 and 3, the reference character 10 designates in its entirety an eye shield which embodies the novel features of my invention. The eye shield 10 comprises a transparent member 11 of celluloid or the like, the transparent member 11 being flexible so that it may be made to conform to the peripheries of lenses of various forms and sizes. The flexible member 11 is shown in connection with a lens 12 of a pair of eyeglasses 13, and as shown is adapted to extend rearwardly from the lens to protect the eyes of the wearer from dust and strong air currents.

Means are provided for detachably securing the eye shield 10 to the lens 12, the means comprising a continuous strip 14 of rubber or other suitable material. The strip 14 is secured to the inner surface of the transparent member 11 by being cemented thereto in a position wherein it lies adjacent the forward edge of the transparent member. As shown in Figs. 2 and 3, the strip 14 is continuously grooved as at 15 to receive the rim 16 of the lens 12, it being understood that the rim 16 is of the type usually employed to hold or reinforce the lenses of eyeglasses. It is of course understood that my attachment may be employed either with the eyeglasses or spectacles which are protected by rims or with the so-called rimless type, and I shall employ the term "rim" to refer to either the part generally so-called or to the edge of a lens. It will be noted that the strip 14 partially encircles the rim 16 when it is properly placed thereon, and that it embraces the edge of the lens, the strip being held in place by the yielding engagement of the sides of the groove therein with the rim, (Fig. 2) thus tending to detachably secure the shield to the lens. However, I find it advantageous to embed a plurality of wires 17 in the strip 14, which wires 17 assist the strip in its function of detachably securing the shield to the lens. Each of the wires 17 has its extremities embedded within the strip 14 and its central portion protruding from one end of the strip, this protruding portion of each wire 17 being shaped to conform to a transverse section of the rim 16. As shown in Fig. 3, the ends of one wire 17 lie in close proximity to the ends of the other wire 17 so that each portion of the strip 14 may be said to be reinforced by the wires 17. The advantage of providing a plurality of wires 17 instead of providing a single loop of wires extending end to end of the strip 14 is that the eye shield may be easily flattened and placed in an envelope or the like. (Fig. 3).

I prefer to provide the transparent member 11 and the strip 14 with an aperture 20 extending therethrough, which will permit the eye shield to be used in connection with glasses having ear pieces or bows 21 as indicated by the dotted lines in Fig. 1.

It will be readily understood that when the eye shields are to be employed in connection with a pair of glasses which do not comprise earpieces or bows, the eye shields may be quickly clipped into their proper positions upon the rims of the lenses, the grooves 15 in the strips 14 being adapted to receive the rims, and the strips themselves being adapted with the aid of the wires 17 to hold the eye shields in their proper positions upon the lenses. Should it so happen that the eye shields are to be employed in connection with glasses having ear pieces or bows, the shields may be threaded upon the bows by way of the aperture 20 and brought into positions wherein they may be clipped upon the rims.

I prefer to make the wires 17 out of spring metal as the wires may then be arranged or designed to normally hold the transparent members 11 and the strips 14 in substantially arcuate forms so as to conform to the peripheries of the lenses. The advantage of this construction is apparent. However, in some instances I may find it preferable to employ annealed wire in the manufacture of the wires 17, as in some instances it will be preferable to shape the shields to fit accurately a single pair of glasses.

In Figs. 4, 5, and 6 I have shown an eye shield which illustrates another form my invention may take. This eye shield which is designated by the reference character 10$^a$ comprises a transparent member 11$^a$ which may be identical with the transparent member 11 of the eye shield 10 shown in Figs. 1, 2, and 3 of the drawing. The flexible member 11$^a$ has secured to its by cement or other suitable means a flexible strip 14$^a$ which resembles the strip 14 of Figs. 1, 2, and 3. The strip 14$^a$ is provided with a groove 15$^a$ adapted to receive marginal portions of the lens 12$^a$ of a pair of glasses 13$^a$. The lens 12$^a$ is not provided with a reinforcing rim, the bow 21$^a$ and the bridge 22$^a$ being secured directly to the lens by means of screws or other suitable fastenings. The strip 14$^a$ is of sufficient length so that it may nearly encircle the lens 12$^a$ and it has embedded in it a pair of wires 17$^a$ which are similar to the wires 17 of the eye shield illustrated in Figs. 1, 2, and 3. The medial portions of the wires 17$^a$ not only conform to the edge of the lens 12$^a$ but also serve as hooks adapted to receive a rubber band 23$^a$. It is apparent that the rubber band 23$^a$ serves to secure the eye shield 10$^a$ in its proper position upon the lens 12$^a$. The eye shield 10$^a$, like the eye shield 10, is provided with an aperture 20$^a$, through which the bow 21$^a$ may be threaded.

I am aware that changes in the form, construction and arrangement of parts may be made without departing from the spirit and without sacrificing the advantages of the invention and I reserve the right to make all such changes as fairly fall within the scope of the following claims.

I claim—

1. The combination with a pair of eyeglasses, of an eye shield comprising a flexible member, a rubber strip secured to the flexible member and having a groove adapted to receive the rim of a lens of the eyeglasses, and yielding means associated with the rubber strip for holding the rubber strip and the flexible member in an arcuate form.

2. An attachment for eyeglasses and the like comprising a shield, said shield having a continuous resilient strip shaped to embrace the rim of a lens and containing yielding reinforcing means.

3. An attachment for eyeglasses and the like comprising a shield, said shield having a continuous resilient strip shaped to embrace the edge of a lens and containing yielding reinforcing means, said yielding reinforcing means projecting from each end of the continuous strip, whereby the ends may be connected to hold the attachment on a lens.

ARVID C. YOUNGQUIST.